April 21, 1925.　　　　　　　　　　　　　　　　1,534,917
E. CLARKE

ARMBAND, GARTER, AND THE LIKE

Filed Oct. 12, 1921

Patented Apr. 21, 1925.

1,534,917

UNITED STATES PATENT OFFICE.

ERNEST CLARKE, OF REDDITCH, ENGLAND.

ARMBAND, GARTER, AND THE LIKE.

Application filed October 12, 1921. Serial No. 507,279.

*To all whom it may concern:*

Be it known that I, ERNEST CLARKE, a subject of the Kingdom of Great Britain, residing at Station Approach, Redditch, in the county of Worcester, England, have invented certain new and useful Improvements in or Relating to Armbands, Garters, and the like, of which the following is a specification.

This invention comprises certain improvements in or relating to armbands, garters, suspenders, and the like, of the type characterized by the employment of an expansible metallic flexible spring.

More particularly the invention comprises, in an armband or garter, an expansible metallic annular spring member, advantageously in the form of a flexible spiral spring of either circular, elliptical, or flattened cross-section, enclosed loosely within a tubular annular covering member, advantageously of silk or like fabric having limited expansibility, the two members being so combined that the metallic annular spring member is free to be expanded within the circumferential limits of the tubular annular covering member.

The invention further comprises means of coupling up the flexible metallic spiral spring into annular form within the tubular cover, said coupling means consisting of a small flat metal plate adapted to be passed in opposite directions into the abutting ends of the spring and to be rotatably engaged therewith by means of double-hooked extremities formed by longitudinally splitting or bifurcating said extremities and turning and hooking the thereby separated parts laterally in opposite directions to engage between the coils of the spring. It is to be understood, however, that the invention is not to be limited to this means of coupling up the metallic spring member, as various equivalent coupling means may be utilized.

In order that this invention may be clearly understood and readily carried into practice, reference may be had to the appended explanatory sheet of drawings, upon which:—

Figure 1:
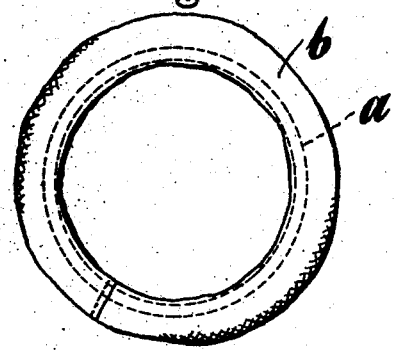
Figure 1 is a plan of an armband or garter constructed in accordance with the present invention.
Figure 2:
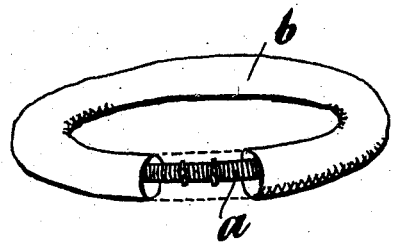
Figure 2 is a perspective view of the same having a part of the tubular annular covering member cut away to show the enclosed annular spring member.
Figure 4:
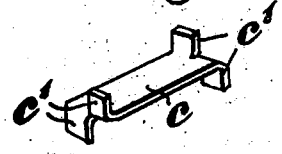
Figure 4 is a perspective view of the coupling plate shown in Figure 3.
Figure 3:
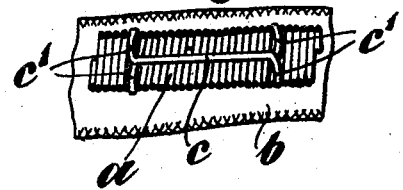
Figure 3 is a fragmentary sectional view illustrating a preferred method of coupling up the ends of the spring member into annular form within the tubular annular covering member.
Figure 5:
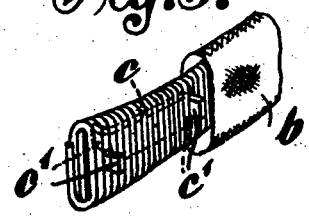
Figure 5 is a fragmentary view illustrating the application of the enclosed annular spring member in an elliptical or flattened cross-sectional form.

In a convenient embodiment of the invention as applied to an armband, or garter, Figures 1 to 5, an annular spring member $a$ in the form of a flexible metallic spiral spring, either of circular cross-section (Figures 1 to 3) or of elliptical or flattened cross-section (Figure 5), is enclosed loosely within and entirely separate from a tubular annular covering member $b$ of silk or like fabric having limited expansibility. The silk tube of which this annular covering member $b$ is composed is of somewhat larger diameter than the diameter of the spiral of which the annular spring member $a$ is composed, and the external diameter of the annulus of the covering member is also somewhat larger than the normal diameter of the annulus of the expansible spring member.

In assembling the armband or garter the silk tube is first slid loosely over the metallic spiral spring and the ends of the spring are then coupled up into expansible annular form, after which the ends of the silk tube are drawn together and connected by stitching or otherwise to complete the tubular annular covering member $b$ within which the metallic annular spring member $a$ is free to circumferentially expand.

In coupling up the ends of the flexible metallic annular spring member $a$, a small flat metal plate $c$, of substantially rectangular formation and of a width adapted to be accommodated within the interior of the spiral spring, may be longitudinally split or bifurcated at its opposite extremities and the thereby separated parts be laterally turned and hooked in opposite directions to provide double-hooked extremities $c^1$ on said metal plate $c$. These double-hooked extremities $c^1$ of the plate are passed in opposite directions into the abutting ends of the spring, the hooks engaging rotatably between the coils of the spring and thereby providing the necessary permanent but detachable flexible connection.

What I claim as my invention and desire to secure by Letters Patent is:—

1. A supporter of the class described comprising a coiled metallic spring member of annular form, and a tubular covering fabric member of annular form and of limited expansibility in which the metallic annular spring member is loosely enclosed, said members being disconnected from each other and being therefore adapted for free relative longitudinal movement, and the metallic annular spring member being limited in its expansion by the limit of expansibility of the tubular annular covering member.

2. A sleeve or hose supporter, comprising a coiled metallic spring member of annular form, a tubular covering fabric member of annular form and of limited expansibility in which the metallic annular spring member is loosely enclosed, said members being disconnected from each other and being therefore adapted for free relative longitudinal movement, and the metallic annular spring member being limited in its expansion by the limit of expansibility of the tubular annular covering member, and a metal plate arranged in the abutting ends of the metallic annular spring member and having double-hooked extremities engaged between coils of the spring member so that said plate couples said ends together.

In witness whereof I have hereunto set my hand.

ERNEST CLARKE.